UNITED STATES PATENT OFFICE.

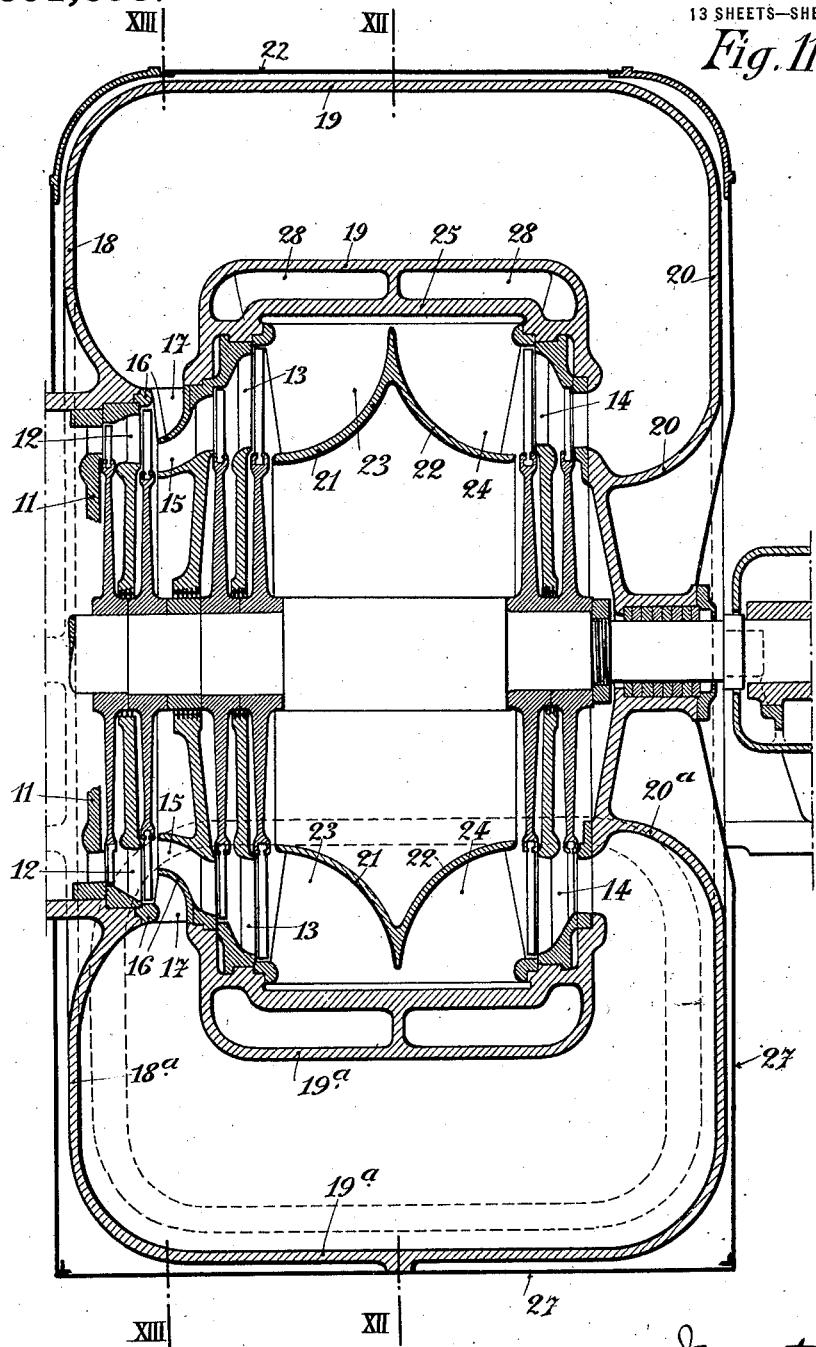

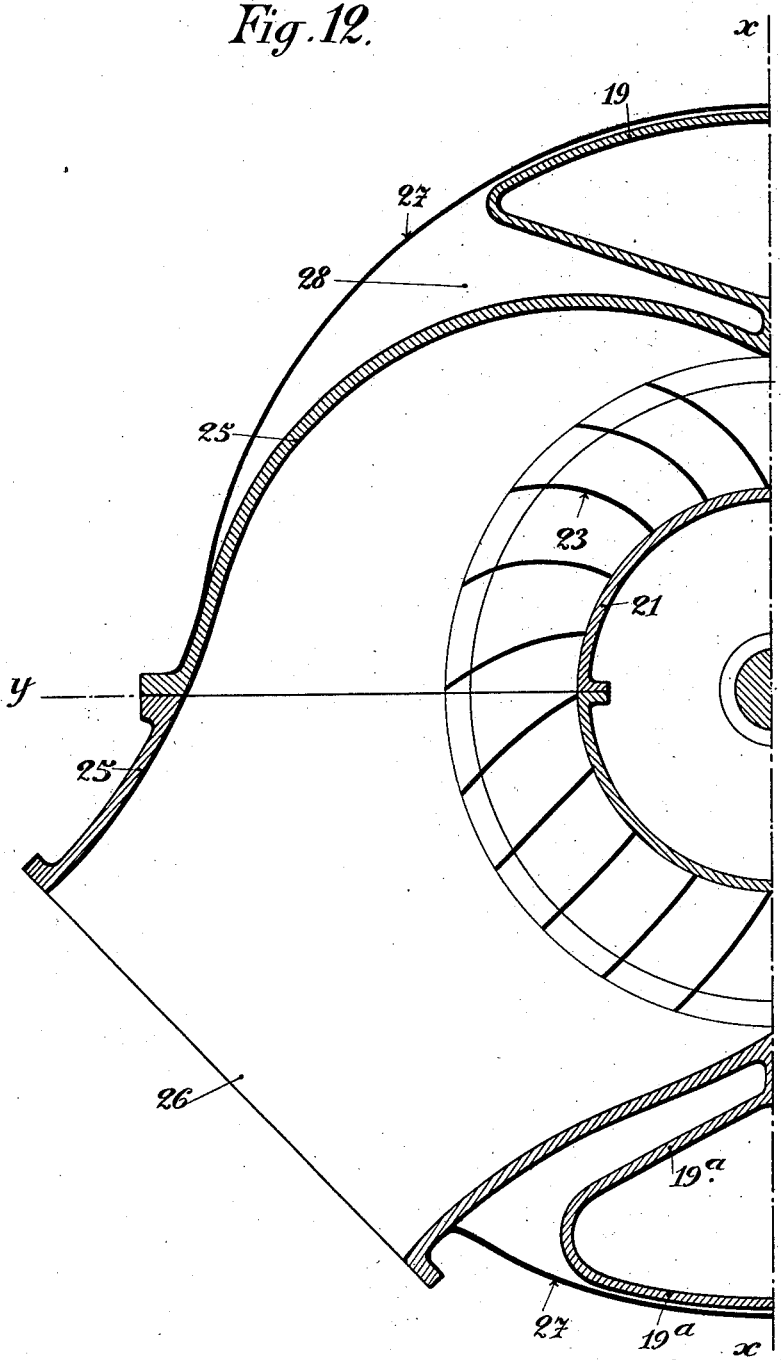

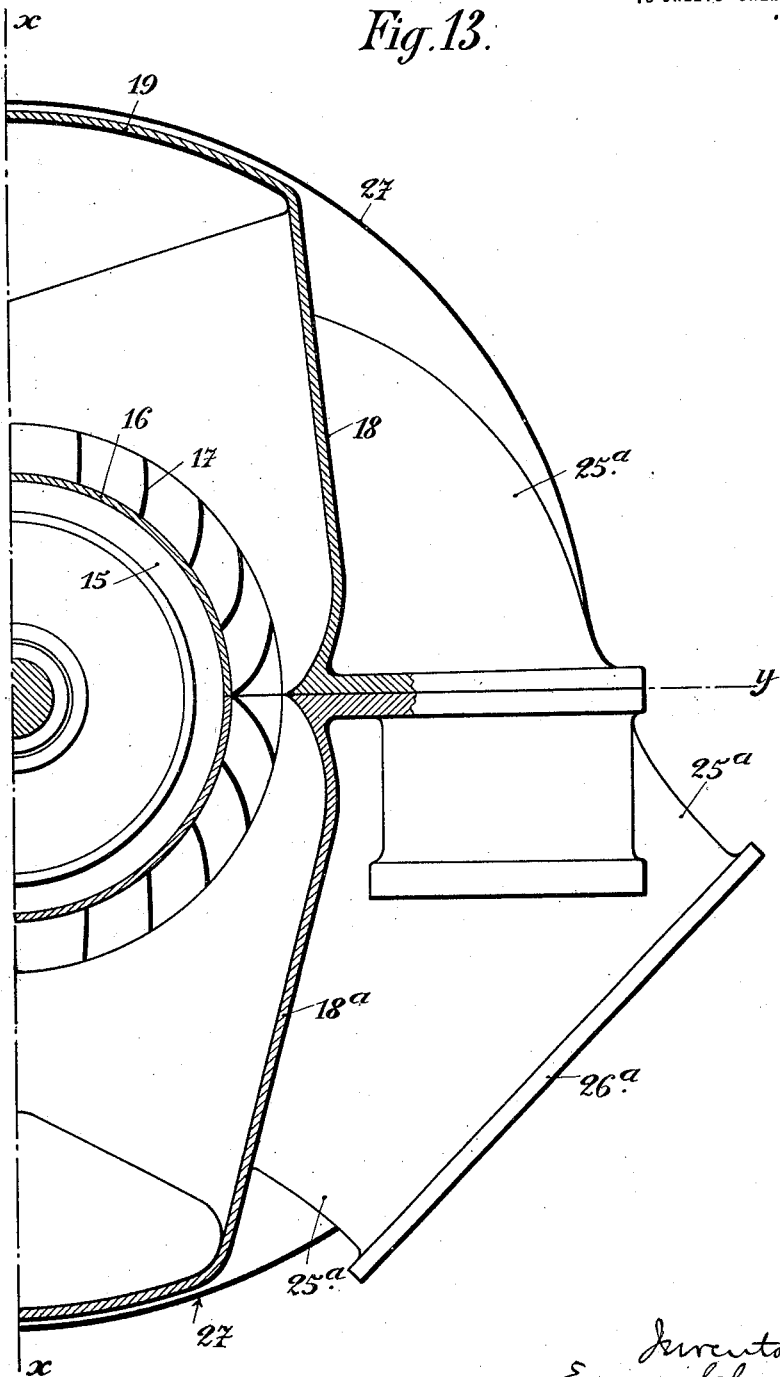

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

STEAM-TURBINE.

1,391,698.        Specification of Letters Patent.        Patented Sept. 27, 1921.

Application filed July 21, 1920. Serial No. 397,951.

*To all whom it may concern:*

Be it known that I, EUGÈNE SCHNEIDER, a citizen of the Republic of France, residing at Paris, France, have invented new and useful Improvements in Steam-Turbines, which invention is fully set forth in the following specification.

This invention consists of improvements in axial-flow steam turbines wherein the low-pressure stage has two or more discharges.

In this known type of turbine the steam issuing from an intermediate stage is directed into two or more series of low-pressure stages wherein it is discharged either in the same direction as in the high-pressure stages or in a direction opposite thereto.

The object of the present invention is to provide devices contained in the turbine casing that will allow of directing the steam issuing from the intermediate stage, as well as the exhaust steam, in such a manner as to diminish the velocity losses due to sudden changes of direction, as well as to avoid condensation losses.

In the known turbines of this type, the steam taken from an intermediate stage is directed into the low-pressure stages through a simple duct in which great velocity losses occur, and this duct is contained in the exhaust casing so that a considerable portion of its wall is subjected to the cooling action of the cooler medium adjacent to the condenser in which it is immersed.

According to the present invention the discharge of the fluid from the intermediate stage to the low-pressure stages and to the condenser, is effected in such a manner as to obviate all those drawbacks.

To this end, the discharge duct for the steam issuing from the intermediate stage, comprises at its inlet, that is to say, at the outlet of the intermediate stage wheel, a directing blading, in other words, a ring of guide blades, the shapes of which are designed to enable the steam to keep the direction it follows on leaving the wheel and to cause it, by utilizing its residual velocity, to take a direction in accordance with the shape and the arrangement of the ducts proper. By this means the steam is gradually led to the series of the low-pressure stages. Moreover, the collecting ducts from the directing blading which they comprise at the outlet of the intermediate stage to the inlet of the low-pressure stages, are so constructed as to be isolated from contact with the cooler walls of the exhaust casing, and to be rendered non-conducting so as to avoid condensation losses. For this purpose these ducts are arranged completely outside the exhaust casing; they may be covered with a sheet metal covering; and a non-conducting material is inserted between the said ducts, the exhaust casing and the said covering.

Finally, the discharge ducts are constructed in such a manner as to comprise at their exit from the last wheels, rings of guide blades giving to the exhaust steam, by utilizing the residual velocity, a direction in accordance with the shape of the exhaust casing, so that the steam will be gradually led to the exhaust orifice on the way to the condenser.

Various examples of the application of this invention are illustrated in the accompanying drawings.

Fig. 7 is a half section on the line VII—VII of Fig. 6.

Fig. 8 is a half section on the line VIII—VIII of Fig. 6.

Fig. 9 is a half plan of the lower portion of the covering and of the exhaust casing of the turbine.

Fig. 10 is a half plan of the upper portion of the covering and of the exhaust casing of the turbine.

Figs. 11 to 13 illustrate a modification of the example shown in Figs. 1 to 5.

Fig. 11 is a longitudinal section of the semi-double flow turbine with central exhaust.

Fig. 12 is a half cross section on the line XII—XII of Fig. 11.

Fig. 13 is a half cross section on the line XIII—XIII of Fig. 11.

Figure 1:
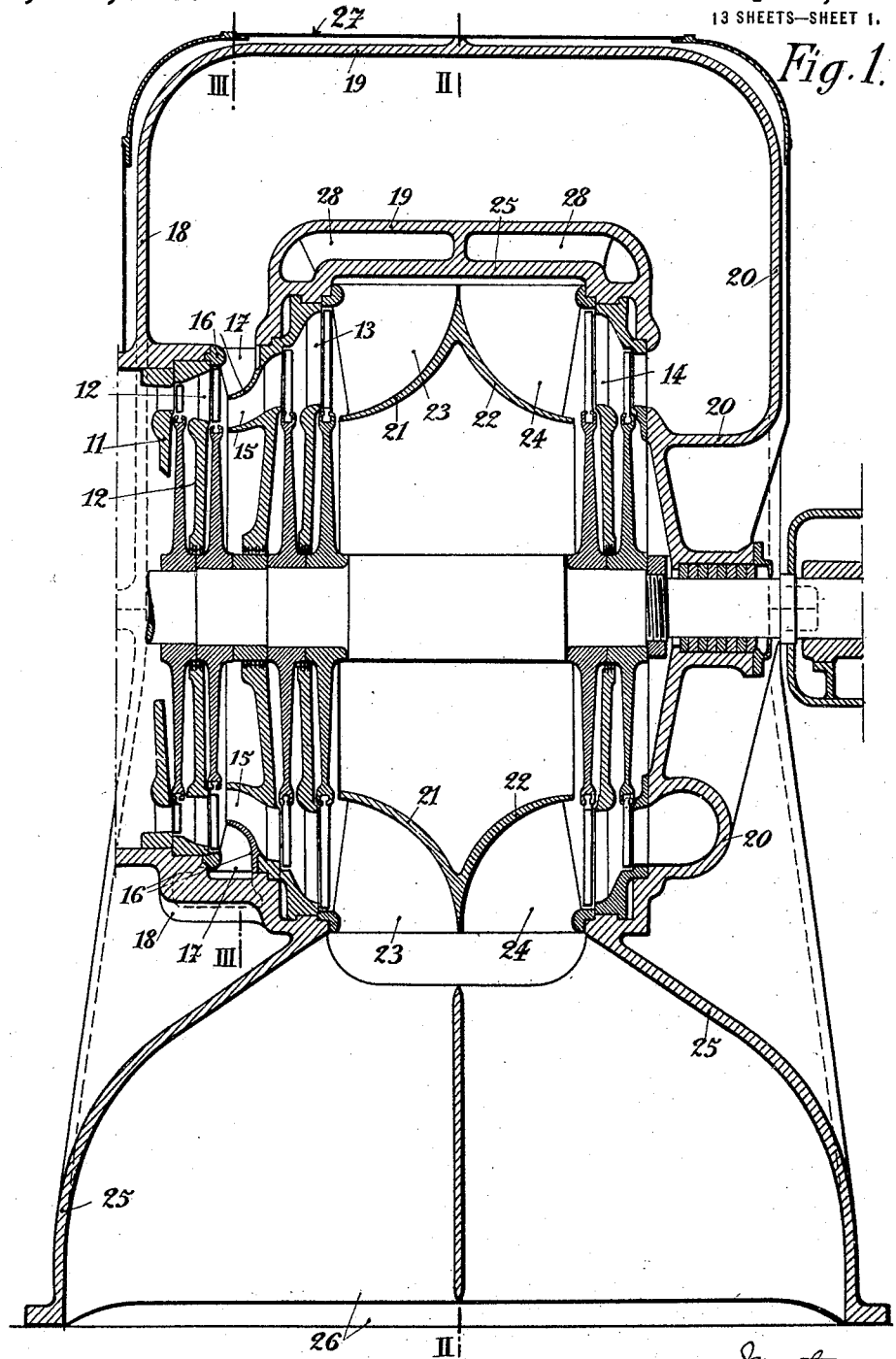
Figure 1 is a longitudinal section of a semi-double flow turbine with central exhaust, comprising the present improvements.
Figure 2:
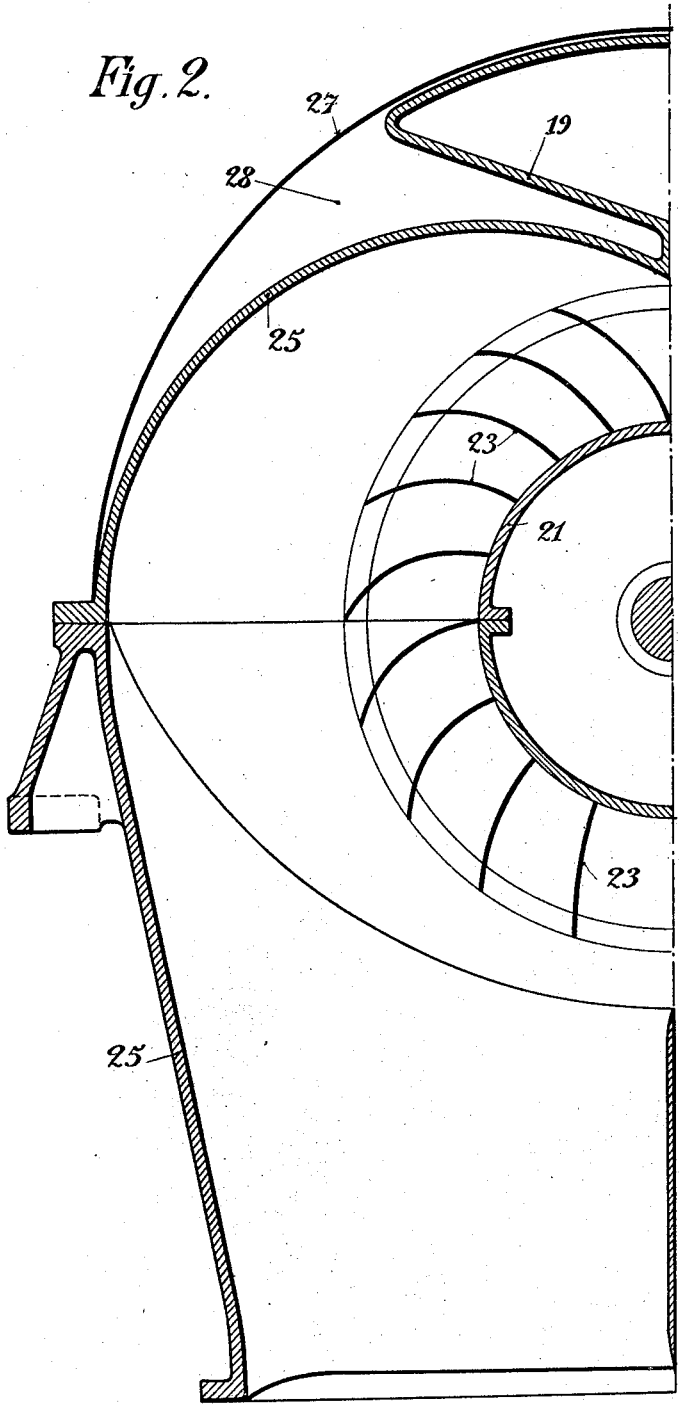
Fig. 2 is a half cross section on the line II—II of Fig. 1.
Figure 3:
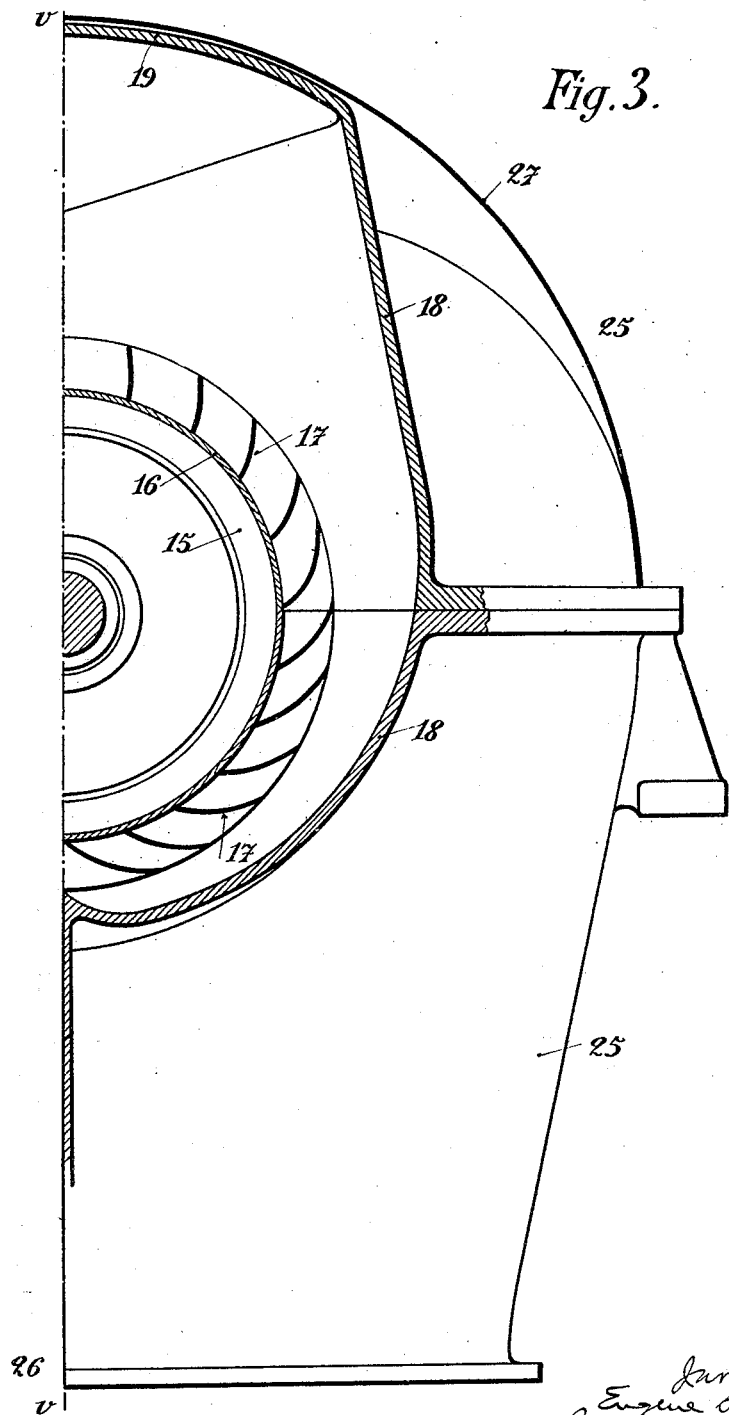
Fig. 3 is a half cross section on the line III—III of Fig. 1.
Figure 4:
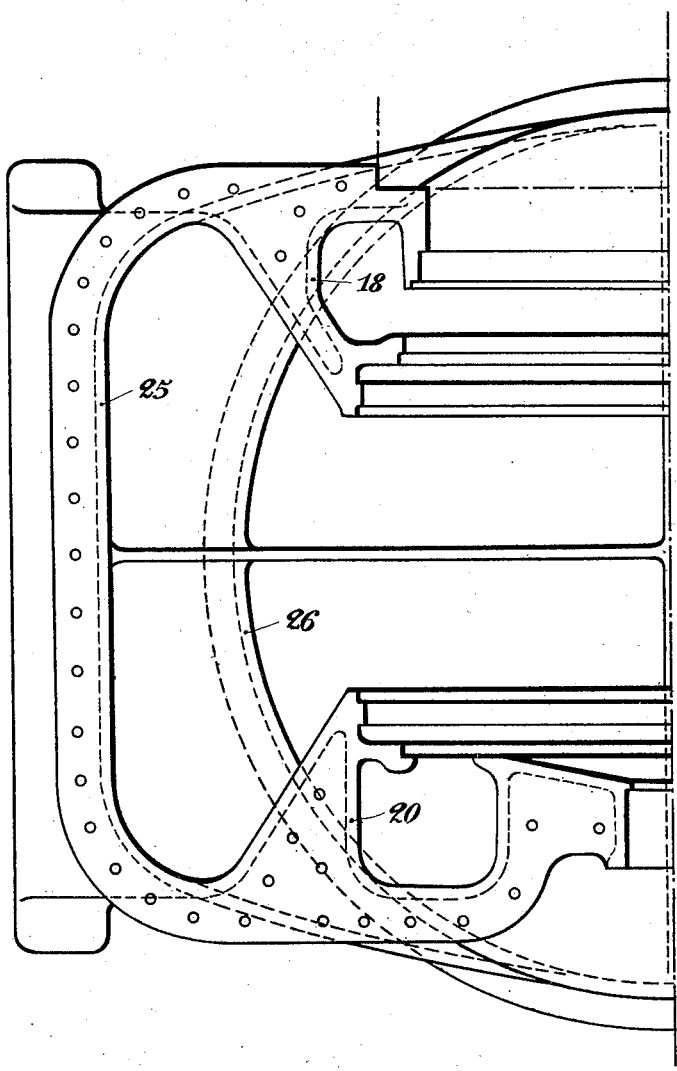
Fig. 4 is a half plan of the lower portion of the covering and of the exhaust casing of the turbine.
Figure 5:
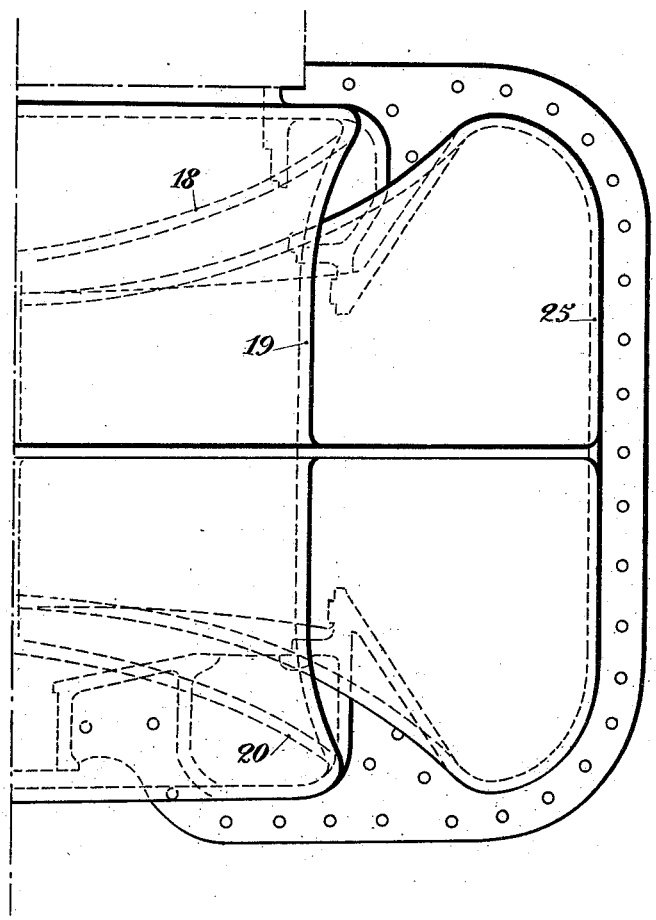
Fig. 5 is a half plan of the upper portion of the covering and of the exhaust casing of the turbine.
Figure 6:
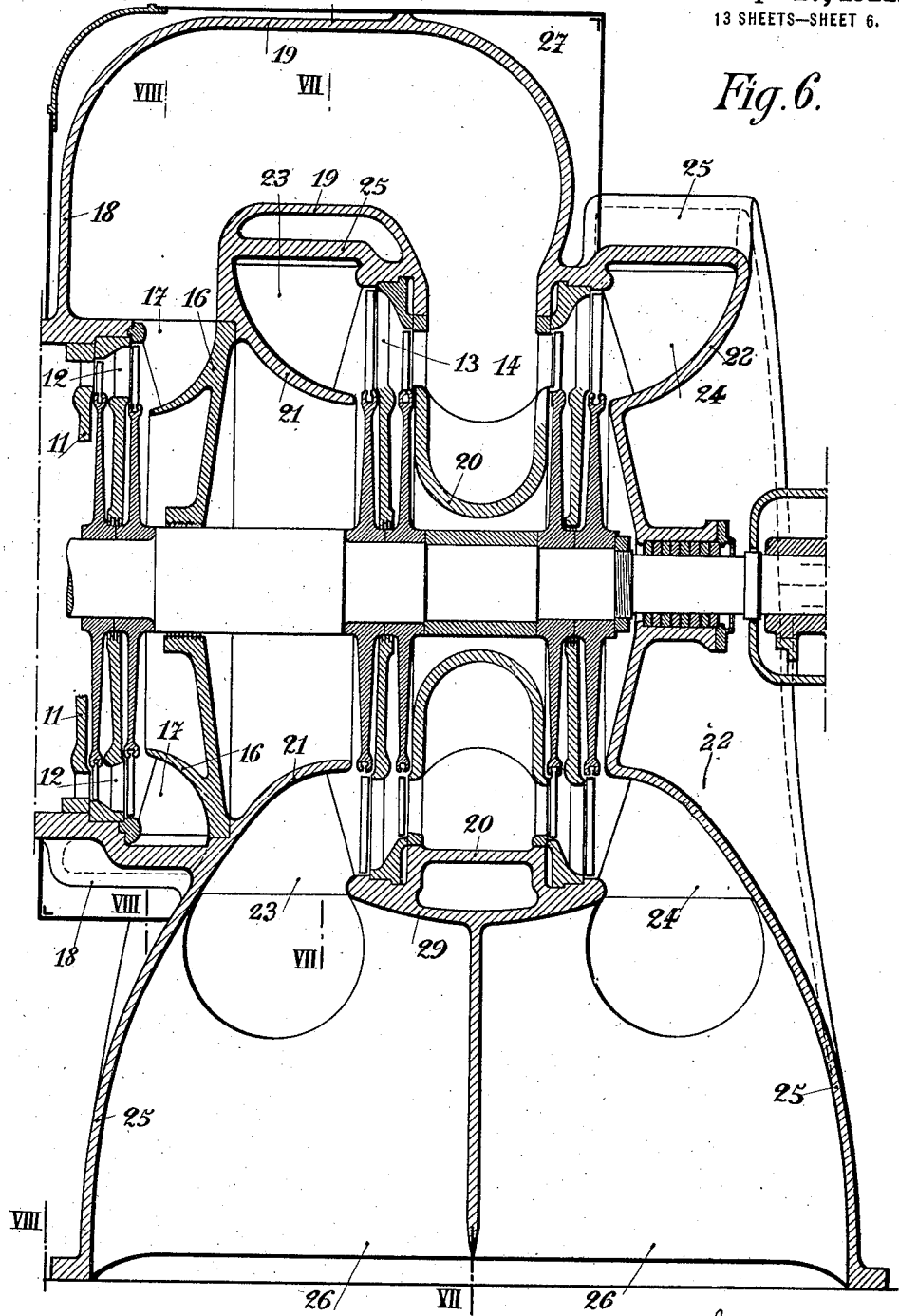
Figs. 6 to 10 illustrate an example of the application of this invention to a semi-double flow turbine with lateral exhaust outlets.
Figure 7:
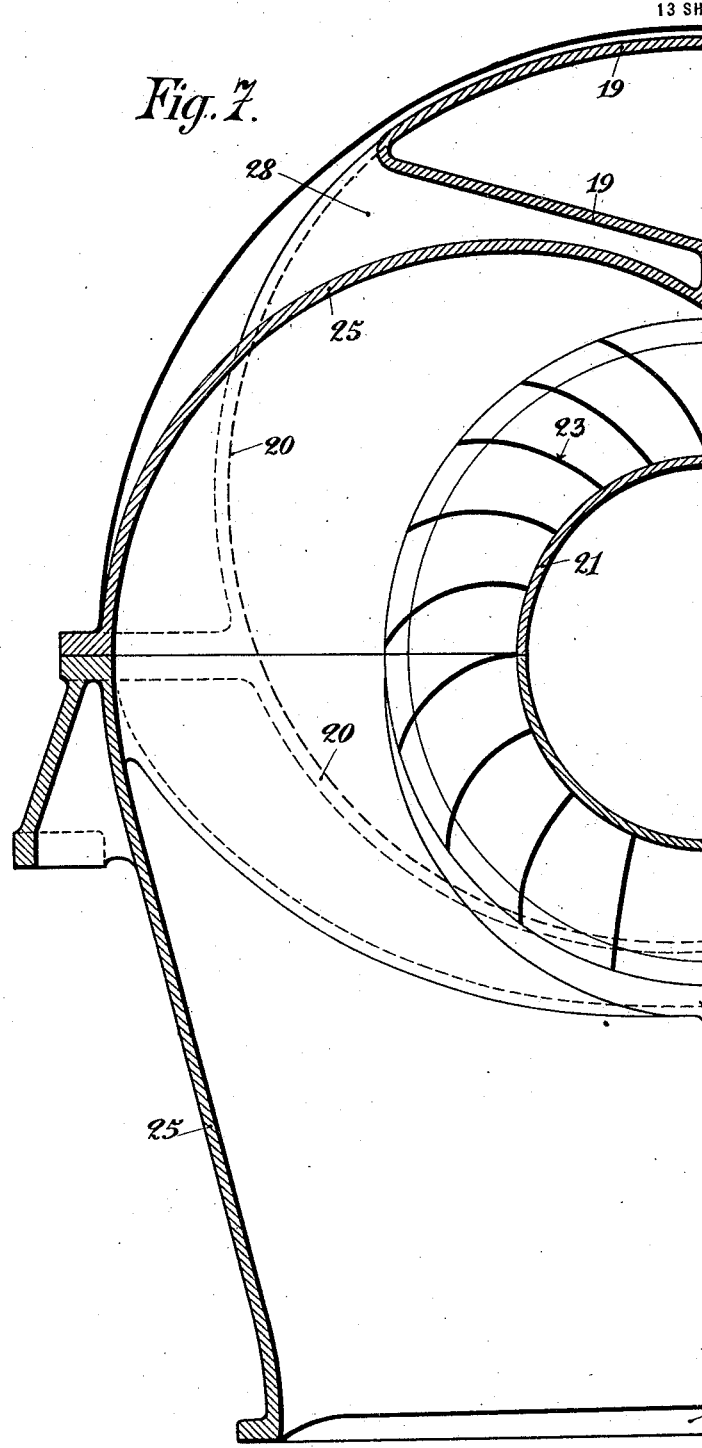
Figure 8:
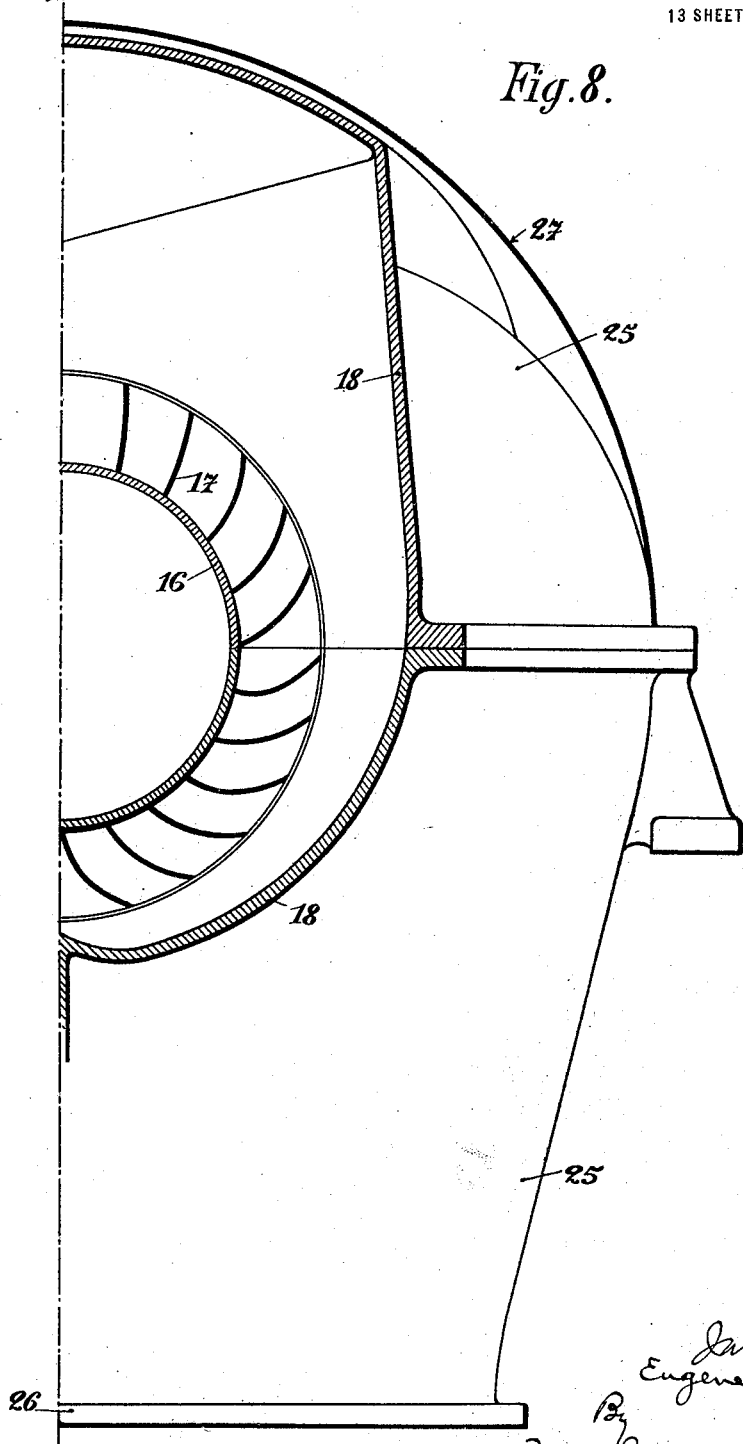
Figure 9:
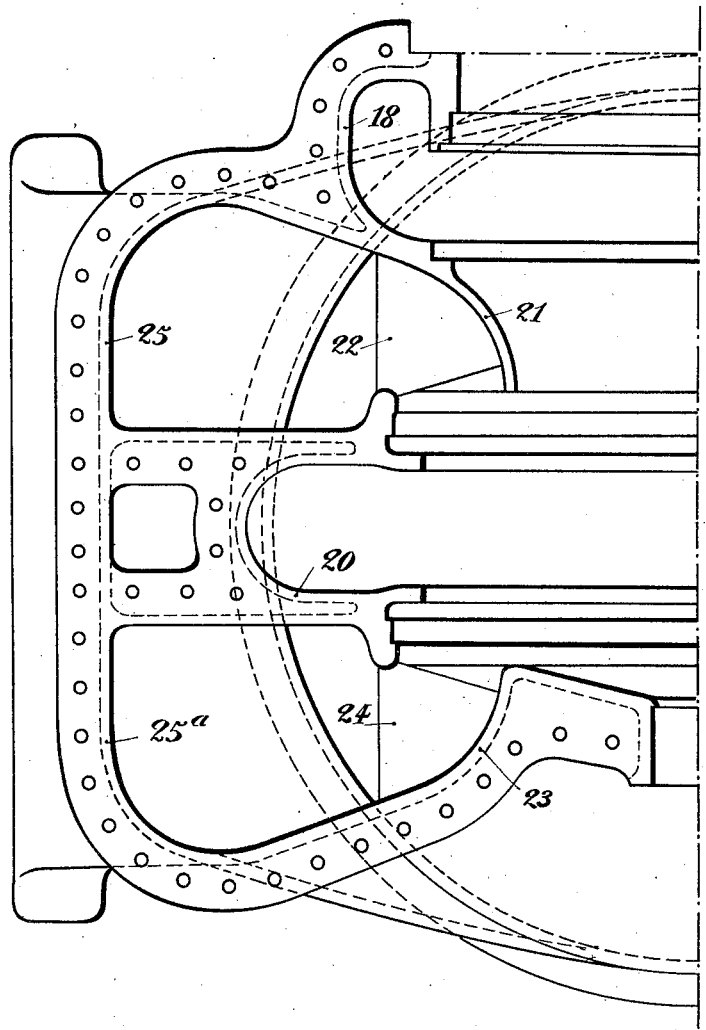
Figure 10:
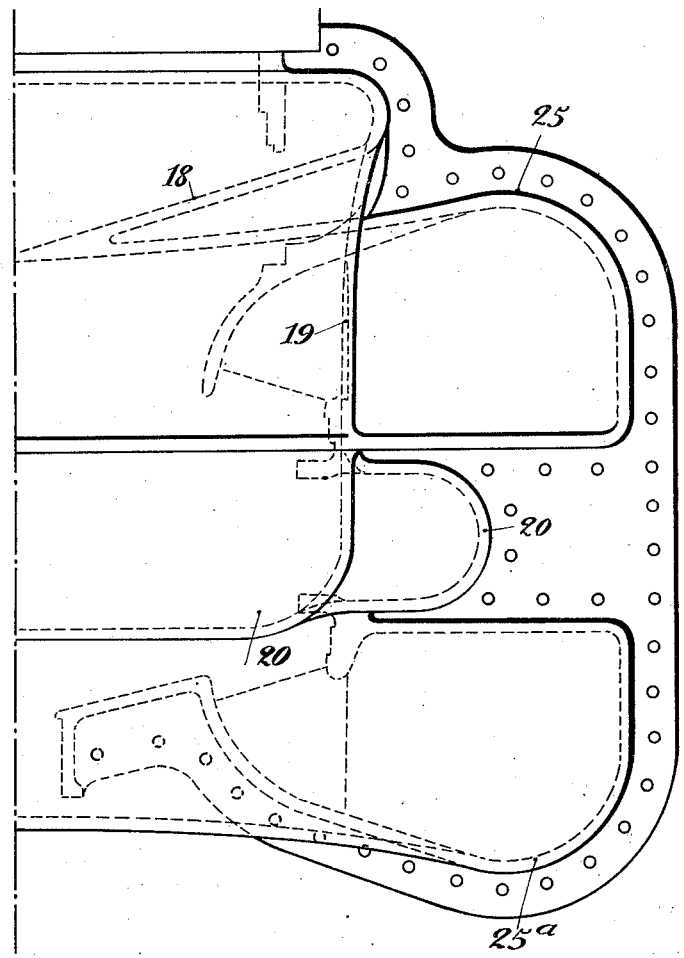

In the example shown in Figs. 1 to 5, a portion of the steam of the intermediate stage is directed into the series of low-pressure stages where the flow is oppositely directed to the flow of the high-pressure steam.

Only the end marked 11 of the single-flow high-pressure portion of the turbine is shown in the drawings.

The intermediate stage is indicated at 12. The series of double-flow stages are shown at 13 and 14.

According to this invention the flow of the steam from the intermediate stage 12 to the low-pressure stages takes place through a disk having two concentric ducts, namely, (1) An inner annular duct 15 for the flow of the fluid to the nearest low-pressure stages 13, and through which there also passes a portion only of the steam coming from the intermediate stages; (2) peripheral inclosing blading formed by the annular guide 16 and the directing vanes 17, and through which there passes another portion of the steam coming from the said intermediate stages to be directed through a collector 18—19—20, into the low-pressure stages 14 which are arranged symmetrically to the stages 13 relatively to the axial plane II—II of the said collector, which is at the same time the vertical axial plane of the exhaust casing 25—26.

The vanes 17 are curved to a shape combined with the direction of the steam issuing from the intermediate stage, and imparting to the steam, by utilizing its residual velocity at its exit from the stage 12, a direction in accordance with the shape of the collector 18. The collector 18 has varying sections so as to direct the steam gradually into the passage 19.

Since the collector 18 is symmetrical in relation to the plane v—v (Figs. 2 and 3), the directing vanes 17 are arranged symmetrically with relation to the same plane.

The steam issuing from the collector 18 passes into the passage 19 which guides it into the receiving collector 20.

The receiver 20 has varying sections in the same manner as the collector 18 in order to guide the steam gradually to the entrance of the bladings of the low-pressure series 14.

It is to be noted that the collector 18—19—20 which follows on the blading 17, and by which the portion of steam taken from the intermediate stage, is directed to the more distant low-pressure stages 14, is, according to this invention, placed wholly outside the exhaust casing 25. This collector is thus removed from the cooling action of the said casing. Around the collector there may be arranged an outer covering 27, and the intervals at 28 between this collector covering and the casing 25 may be lined with non-heat-conducting material.

At the exit of the last wheels of the low-pressure stages 13 and 14, two annular guides 21, 22 provided with directing vanes 23, 24, serve to direct the steam into the exhaust casing 25 by utilizing the residual velocity of the steam.

The two opposite low-pressure stages 13 and 14 and the intervening space are inclosed by the exhaust casing 25 comprising opposite collectors leading from the outlets of said stages to the discharge opening 26 of the casing. Within the exhaust casing 25 are the two contiguous annular ducts 21 and 22 forming conduits from the outlets of the pressure-stages 13 and 14, respectively, to the collectors of the exhaust casing. In the annular ducts 21 and 22 are the two series of guiding vanes 23 and 24, respectively, curved similarly to the vanes 17, and operating to utilize the residual velocity of the fluid-pressure at its exit from the outlets of their respective pressure stages to guide the fluid-pressure in the direction of the collectors leading from said outlets to the discharge opening of the exhaust casing.

Like the collector 18—19—20, the exhaust casing 25 is made of varying sections so as to guide the steam gradually to the exit orifice 26 leading to the condenser.

Figs. 6–10 inclusive illustrate a semi-double flow turbine in which the whole of the steam issuing from the intermediate stage is led into a central receiving collector to be distributed to the two series of low-pressure stages where the flow of the steam takes place in opposite directions. The exhaust steam casings are arranged laterally and join each other at the inlet orifice of the condenser. The elements of this type of turbine, corresponding to those of the preceding example, are designated by the same letters.

In this type of turbine, the whole of the steam issuing from the intermediate stage 12, passes into an annular guide 16 provided with directing vanes 17 which direct the steam by way of the collector 18 and the passage 19 into the central receiving collector 20 whence the steam is distributed symmetrically to the two series of low-pressure stages 13 and 14 where the flow takes place in opposite directions.

The exhaust of the steam at the outlet of the last wheels of the series of stages 13 and 14, is directed by the guiding vanes 23—24 into the annular ducts 21—22, respectively, leading into the symmetrical exhaust collectors forming the casing 25. These two exhaust collectors are independent of each other and join together only at the exit orifice 26 leading to the condenser.

An outer packing covering 27 serves to insulate the outer walls of the ducts that lead off the steam issuing from the intermediate stage 12.

29 is a wall situated inside the lower portion of the exhaust casing; it has a rounded shape to allow of an easy flow of the exhaust steam and it constitutes an insulating chamber for the hot wall of the receiving collector 20.

The various parts of this type of turbine, although differently arranged, are designed on the same principle as in the turbine of the type just hereinbefore described.

In this case, as in the preceding example, an apparatus is provided for the continuous direction of the fluid, without cooling same, from the intermediate stage to the various low-pressure stages and to the exhaust casing. This apparatus comprises the directing blading 16—17 followed by the collecting ducts 18—19—20 isolated from all contact with the exhaust casing 25, and finally the direction of the fluid by directing bladings (21, 22, 23, 24) at its exit from the low-pressure stages.

The guide vanes 21—22—23—24 are shown as being formed in one piece with the covering, but they may equally well be attached thereto as shown in Fig. 1.

In the example illustrated in Figs. 11 to 13, a portion of the steam issuing from the intermediate stage 12, is, as in the example shown in Figs. 1-5, directed to the series of low-pressure stages 14, but in the present case two collectors 18 and 18$^a$ are provided, together with two passages 19 and 19$^a$ and two receiving collectors 20 and 20$^a$, making together two crossing ducts 18—19—20, 18$^a$—19$^a$—20$^a$ arranged symmetrically in relation to the plane of the horizontal axis.

The directing vanes 17 of the annular guide 16 are arranged symmetrically in relation to the vertical axis $x$—$x$ and also in relation to the horizontal axis $y$—$y$ so as to direct correctly the steam into the collectors 18 and 18$^a$.

The collectors 18—19—20 and 18$^a$—19$^a$—20$^a$ are in this case also attached to the outer side of the exhaust casing 25. The latter is divided into two symmetrical casings 25 and 25$^a$ which instead of joining to form a common orifice, have each their exhaust orifice leading to the condensers 26 and 26$^a$ respectively.

The illustrated examples relate only to double-flow turbines, but it is to be understood that the invention is applicable also to turbines having any desired number of flows.

It is also to be understood that the arrangement of the hereinbefore described ducts is applicable likewise to the case where the low-pressure stages 13 and 14 might be contained alone in a turbine body, the high-pressure stages up to the stage 12 being contained in another turbine body separate from the other.

Having now particularly described and ascertained the nature of my said invention and in what manner the same is to be performed, I declare that what I claim is:—

1. In a turbine, a casing containing a plurality of pressure-stages through which successively flows the fluid-pressure, a collector in the casing leading from the outlet of a preceding pressure-stage to the inlet of a succeeding pressure-stage, and a series of guiding vanes at the outlet of the preceding pressure-stage operating to utilize the residual velocity of the fluid-pressure at its exit from said preceding pressure-stage to guide the fluid-pressure in the direction of the collector leading to the succeeding pressure-stage.

2. In a turbine, a casing containing a plurality of pressure-stages through which successively flows the fluid-pressure, an annular duct at the outlet of a preceding pressure-stage, a collector in the casing leading from the annular duct to the inlet of the succeeding pressure-stage, and a series of guiding vanes in the annular duct operating to utilize the residual velocity of the fluid-pressure at its exit from said preceding pressure-stage into said annular duct to guide the fluid-pressure in the direction of the collector leading to the succeeding pressure-stage.

3. In a turbine, a main casing containing a higher pressure-stage and opposite lower pressure-stages having an intervening space and with the outlet of the higher pressure-stage communicating directly with the inlet of the adjacent lower pressure-stage, a collector leading from the outlet of the higher pressure-stage to the inlet of the farther lower pressure-stage, an exhaust casing inclosing the opposite lower pressure-stages and the intervening space and comprising collectors leading from the outlets of the lower pressure-stages to the discharge opening of said exhaust casing, and a series of guiding vanes separate from the collectors and in annular arrangement in the space inclosed by the exhaust casing and directly at the outlet of each lower pressure-stage operating to utilize the residual velocity of the fluid-pressure immediately at its exit from said outlet to guide the fluid-pressure in the direction of the collector leading from said outlet.

4. In a turbine, a main casing containing a higher pressure-stage and opposite lower pressure-stages having an intervening space and with the outlet of the higher pressure-stage communicating directly with the inlet of the adjacent lower pressure-stage, a collector leading from the outlet of the higher pressure-stage to the inlet of the farther lower pressure-stage, an exhaust casing inclosing the opposite lower pressure-stages and the intervening space and comprising collectors leading from the outlets of the lower pressure-stages to the discharge opening of said exhaust casing, annular ducts within the exhaust casing with each duct forming a conduit between the outlet of a lower pressure-stage and the collector leading from said outlet, and a series of guiding vanes separate from the collector and in annular arrangement within each annular duct operating to utilize the residual velocity of the fluid-pressure immediately at its exit from the communicating lower pressure-stage into said duct to guide the fluid-pressure in the direction of the collector leading from said duct.

5. In a turbine, a casing containing a higher pressure-stage and a plurality of lower pressure-stages, concentric annular ducts at the outlet of the higher pressure-stage with the inner duct leading directly to the inlet of the adjacent lower pressure-stage, a collector in the casing leading from the outer annular duct to the inlet of the farther lower pressure-stage, and a series of guiding vanes in the outer annular duct operating to utilize the residual velocity of the fluid-pressure at its exit from the higher pressure stage into said outer annular duct to guide the fluid-pressure in the direction of the collector leading from said outer annular duct to the farther lower pressure-stage.

6. In a turbine, a casing containing a higher pressure-stage and opposite lower pressure-stages, concentric annular ducts at the outlet of the higher pressure-stage with the inner duct leading directly to the inlet of the adjacent lower pressure-stage, a collector in the casing leading from the outer annular duct to the inlet of the farther lower pressure-stage, and a series of guiding vanes in the outer annular duct operating to utilize the residual velocity of the fluid-pressure at its exit from the higher pressure-stage into said outer annular duct to guide the fluid-pressure in the direction of the collector leading from said outer annular duct to the farther lower pressure-stage.

7. In a turbine, a main casing containing a higher pressure-stage and opposite lower pressure-stages having an intervening space and with the outlet of the higher pressure-stage communicating directly with the inlet of the adjacent lower pressure-stage, an exhaust casing inclosing the opposite lower pressure-stages and the intervening space and comprising collectors leading from the outlets of the lower pressure-stages to the discharge opening of said exhaust casing, a collector leading from the outlet of the higher pressure-stage over the exhaust casing to the inlet of farther lower pressure-stage, and means for insulating the last-mentioned collector from the exhaust casing to prevent cooling of the pressure-fluid passing through said collector by the cooler discharge in the exhaust casing.

8. In a turbine, a main casing containing a higher pressure-stage and opposite lower pressure-stages having discharge collectors leading from their outlets through a discharge casing, concentric annular ducts at the outlet of the higher pressure-stage with the inner of said ducts communicating with the inlet of the adjacent lower pressure-stage, a collector leading from the outer annular duct to the inlet of the farther lower pressure-stage, and means for insulating said collector from said discharge casing to prevent cooling of the pressure-fluid passing through said collector by the cooler exhaust in the discharge casing.

In testimony whereof I have signed this specification.

EUGÈNE SCHNEIDER.

Witnesses:
ANDRÉ MOSTICKER,
CLEMENT S. EDWARDS.